US009586447B2

(12) United States Patent
Van Der Meulen et al.

(10) Patent No.: US 9,586,447 B2
(45) Date of Patent: Mar. 7, 2017

(54) ANTISTATIC VEHICLE TIRE AND METHOD OF MANUFACTURING SUCH A TIRE

(71) Applicant: Apollo Tyres Global R&D B.V., Enschede (NL)

(72) Inventors: Evert-Jan Jitse Van Der Meulen, Wierden (NL); Peter Jaap Snel, Eindhoven (NL); Walter Johannes Maria Roerdink, Terborg (NL); Harmen Hepkema, Enschede (NL)

(73) Assignee: Apollo Tyres Global R&D B.V., Enschede (NL)

(*) Notice: Subject to any disclaimer, the term of this patent is extended or adjusted under 35 U.S.C. 154(b) by 289 days.

(21) Appl. No.: 14/349,670

(22) PCT Filed: Sep. 21, 2012

(86) PCT No.: PCT/NL2012/050668
§ 371 (c)(1),
(2) Date: Apr. 4, 2014

(87) PCT Pub. No.: WO2013/051930
PCT Pub. Date: Apr. 11, 2013

(65) Prior Publication Data

US 2014/0283964 A1 Sep. 25, 2014

(30) Foreign Application Priority Data

Oct. 6, 2011 (NL) .................................... 2007544

(51) Int. Cl.
*B60C 19/08* (2006.01)
*B60C 11/00* (2006.01)
(Continued)

(52) U.S. Cl.
CPC .......... *B60C 19/082* (2013.04); *B29C 47/065* (2013.01); *B29D 30/0681* (2013.01);
(Continued)

(58) Field of Classification Search
CPC ..... B60C 19/082; B60C 19/08; B60C 11/005; B60C 11/0058; B60C 11/0066;
(Continued)

(56) References Cited

U.S. PATENT DOCUMENTS

2008/0308203 A1* 12/2008 Kunisawa ............ B60C 19/082 152/152.1
2015/0158344 A1* 6/2015 Kishizoe .............. B60C 19/082 152/152.1

FOREIGN PATENT DOCUMENTS

EP 0 658 452 A1 6/1995
EP 0 718 127 A1 6/1996
(Continued)

OTHER PUBLICATIONS

International Search Report for corresponding International Application No. PCT/NL2012/050668 mailed Nov. 2, 2012.

*Primary Examiner* — Adrienne C Johnstone
(74) *Attorney, Agent, or Firm* — Renner, Otto, Boisselle & Sklar, LLP

(57) ABSTRACT

The invention relates to a vehicle tire comprising a tread portion and a package of reinforcement layers arranged underneath the tread portion. The tread portion comprises a tread base layer arranged underneath the tread layer, and at least one rubber member that extends in the radial direction of the tire from the ground contacting surface to the reinforcement package. The tread layer rubber composition has an electrical resistivity at room temperature of more than 108 ohm-cm, the tread base layer rubber composition of between 106 ohm-cm and 108 ohm-cm, the member rubber composition of less than 106 ohm-cm; and the rubber composition of at least one layer of the reinforcement package has a electrical resistivity at room temperature of less than 106 ohm-cm. The vehicle tire combines a low
(Continued)

rolling resistance with improved conductivity to avoid build-up of static electricity.

18 Claims, 4 Drawing Sheets

(51) Int. Cl.

*B60C 1/00* (2006.01)
*B29D 30/00* (2006.01)
*B29D 30/52* (2006.01)
*C08K 3/04* (2006.01)
*B29C 47/06* (2006.01)
*B29D 30/06* (2006.01)
*C08L 21/00* (2006.01)

(52) U.S. Cl.

CPC ............ *B29D 30/52* (2013.01); *B60C 1/0016* (2013.04); *B60C 11/005* (2013.01); *B60C 11/0058* (2013.04); *B60C 19/08* (2013.01); *C08K 3/04* (2013.01); *C08L 21/00* (2013.01); *B29D 2030/526* (2013.01); *B60C 2011/016* (2013.04); *C08K 2201/006* (2013.01); *Y10S 152/02* (2013.01)

(58) Field of Classification Search

CPC ........... B60C 11/007; B60C 2011/0165; Y10S 152/02; B29D 2030/526; B29D 30/52; B29D 30/58; B29D 30/60; B29D 30/62

USPC .............. 152/209.5, 152.1, DIG. 2; 156/129, 156/244.11

See application file for complete search history.

(56) References Cited

FOREIGN PATENT DOCUMENTS

| | | | |
|---|---|---|---|
| EP | 0 847 880 | A1 | 6/1998 |
| EP | 0 878 330 | A2 | 11/1998 |
| EP | 0 895 877 | A1 | 2/1999 |
| EP | 1 533 143 | A1 | 5/2005 |
| EP | 1 533 144 | A1 | 5/2005 |
| EP | 1 792 720 | A2 | 6/2007 |
| EP | 2 193 934 | A2 | 6/2010 |
| JP | 2004-195700 | A | 7/2004 |
| WO | 02/22382 | A1 | 3/2002 |

* cited by examiner

*Fig. 1 - Prior Art*

ANTISTATIC VEHICLE TIRE AND METHOD OF MANUFACTURING SUCH A TIRE

The present invention relates to an antistatic vehicle tire, and to a method of manufacturing such a tire.

BACKGROUND

Traditionally, carbon black has been used in tires to make them conductive and therefore antistatic. Carbon black however may cause hysteresis losses that compromise tire properties such as rolling resistance and handling. To improve fuel economy of automobiles attempts have been made to decrease the rolling resistance of a tire. One major solution has been to use tread rubber compositions having silica as a reinforcing material at the expense of carbon black. Although tread rubber compositions comprising silica may provide increased braking ability on wet roads and decreased rolling resistance, they are generally poorly conducting, which may lead to undesired accumulation of electrical charges on an automobile body. With poorly conducting is meant an electrical resistivity at room temperature of higher than $10^8$ ohm-cm after vulcanization.

Antistatic vehicle tires have been proposed that comprise a poorly conducting tread layer and a conductive tread base layer arranged underneath the tread layer, whereby the ground contacting surface is electrically connected to the conductive tread base layer by providing an electrical connection between the two. EP 0718127 B1 for instance discloses a vehicle tire, wherein the tread base layer comprises chimneys that extend radially outward to the tire ground contacting surface to make the electrical connection.

Although some improvements in antistatic behavior are obtained in the known tire, this generally goes at the expense of other tire properties, such as rolling resistance, handling and durability. The conductive chimneys created between the ground contacting surface of the tread layer and the tire conductive base layer divide the tread layer in a number of mutually separated sections. This construction may weaken the tires and their durability is compromised, for instance because the conductive chimneys of the base layer in between the tread sections tend to separate therefrom in use. It has proven difficult to combine these antagonistic properties into one tire and most tire designs have focused on one of the properties mentioned.

SUMMARY

The present invention aims to provide an antistatic vehicle tire having improved antistatic properties and rolling and handling behavior in comparison with the known antistatic tire, and to provide a method of manufacturing such a tire.

The present invention thereto provides a vehicle tire comprising a tread portion and a package of at least one reinforcement layer arranged underneath (i.e. radially inwards from) the tread portion, the tread portion comprising a tread layer that provides a ground contacting surface and is disposed in a radially outward part of the tire, and a tread base layer arranged underneath the tread layer, the tread portion further comprising at least one rubber member that extends in the radial direction of the tire from the ground contacting surface to the reinforcement package, the tread layer rubber composition having an electrical resistivity at room temperature of more than $10^8$ ohm-cm; the tread base layer rubber composition having an electrical resistivity at room temperature of between $10^6$ ohm-cm and $10^8$ ohm-cm; the member rubber composition having an electrical resistivity at room temperature of less than $10^6$ ohm-cm; and the rubber composition of at least one layer of the reinforcement package having an electrical resistivity at room temperature of less than $10^6$ ohm-cm.

The electrical resistivity of the rubber compositions is measured in accordance with industry codes, preferably ASTM D4496, which involves applying a dc voltage to a sample and measuring the current as resulting from the voltage in the sample. The current and voltage values are used to calculate the volume resistivity (ohm-cm) of the rubber compositions. An alternative would be to measure the surface resistivity in ohms per square cm, but this results in (slightly) different values.

By providing a vehicle tire in accordance with the invention with a poorly conducting tread layer, a moderately conducting tread base layer and at least one well conducting rubber member in electrical contact with a well conducting reinforcement layer it becomes possible to tune the tire properties such that an optimum synergy is reached between antistatic properties and rolling/handling behavior. The known tire with equally good rolling/handling behavior will generally be poor in antistatic properties, whereas the known tire with comparably well antistatic properties will generally provide less rolling/handling properties.

According to the invention, the at least one rubber member extends in the radial direction of the tire from the ground contacting surface to the reinforcement package. This includes embodiments wherein the at least one rubber member extends in the radial direction of the tire to the upper surface of the reinforcement package and not beyond, to an inner surface of the reinforcement package and not beyond, or to the lower surface of the reinforcement package and not beyond. An embodiment wherein the at least one rubber member extends in the radial direction of the tire to the upper surface of the reinforcement package and not beyond is preferred.

According to an embodiment of the invention, a vehicle tire is provided with a tread portion further comprising wing tips that are disposed at either side of the tire in the width direction thereof and extend in a circumferential direction of the tire, the wing tip rubber composition having a electrical resistivity at room temperature of less than $10^6$ ohm-cm. A further improved embodiment provides a vehicle tire wherein the wing tips are arranged in conductive contact with the tread base layer, even more preferred arranged in conductive contact with at least one layer of the reinforcement package, and most preferred arranged in direct contact with the tread base layer and/or arranged in direct contact with a sidewall layer.

These embodiments exhibit a further improved antistatic behavior since at least two conducting paths are created, a first path being provided by the rubber member and at least one layer of the reinforcement package, the second path being provided by the rubber member, the tread base layer and the wing tips. Providing at least two conducting paths allows to conduct more current but also improves the reliability of such conductance. If one path fails another path may still fulfill its function.

There are a number of ways available to the person skilled in the art to influence the electrical resistivity of the rubber layers. A tread layer rubber composition having an electrical resistivity at room temperature of more than $10^8$ ohm-cm for instance may be obtained by providing the tread layer rubber composition with fillers that include silica. The electrical resistivity of the more conducting layers may be altered by providing the rubber compositions with fillers that include carbon black and varying the amount and/or type of the carbon black fillers in the compositions.

According to another embodiment of the invention, a vehicle tire is provided wherein the tread base layer rubber composition comprises 5-25 parts by weight on the total composition of carbon black having a nitrogen adsorption specific surface area ($N_2SA$) according to ASTM D3037 above 60 $m^2/g$ and 10-35 parts by weight on the total composition of carbon black having a nitrogen adsorption specific surface area ($N_2SA$) according to ASTM D3037 below 60 $m^2/g$.

In another embodiment of the invention, the vehicle tire comprises a member rubber composition comprising 15-45 parts by weight on the total composition of carbon black having a nitrogen adsorption specific surface area ($N_2SA$) according to ASTM D3037 above 60 $m^2/g$.

In still another embodiment of the invention, the vehicle tire comprises a wing tip rubber composition comprising 20-50 parts by weight on the total composition of carbon black having a nitrogen adsorption specific surface area ($N_2SA$) according to ASTM D3037 above 60 $m^2/g$.

In yet another embodiment of the invention, the vehicle tire comprises tread base rubber, wing tip rubber and/or reinforcement rubber compositions having a dibutyl phthalate absorption (DBP) according to ASTM 2414-90 of between 60-140 ml/100 g, and more preferably of between 80-110 ml/100 g.

In another aspect of the invention, a vehicle tire is provided comprising a tread base layer and an undertread layer arranged underneath the tread base layer, the undertread layer rubber composition having an electrical resistivity at room temperature of more than $10^6$ ohm-cm. This allows to provide at least two conducting paths that are electrically insulated (or at least less conductive) from each other, a first path being provided by the rubber member and at least one layer of the reinforcement package, the second path being provided by the rubber member, the tread base layer and the wing tips. This embodiment further improves the tire properties, since the undertread layer rubber composition may be formulated to obtain an optimal rolling/handling behavior of the tire while the tread base layer provides one conducting path. Even better properties are obtained when the undertread layer rubber composition has an electrical resistivity at room temperature of more than $10^7$ ohm-cm, more preferred more than $10^8$ ohm-cm, even more preferred more than $10^9$ ohm-cm, and most preferred more than $10^{10}$ ohm-cm.

In yet another aspect of the invention, a vehicle tire is provided wherein the rubber composition of at least one layer of the reinforcement package and/or the rubber member are substantially the same as the rubber composition of the wing tips. Such a tire is more easily manufactured than other embodiments.

A preferred vehicle tire according to the invention comprises a rubber member having a thickness in the width direction of the tire of more than 1 mm. On the other hand, the thickness in the width direction may not be so large as to hamper the rolling resistance of the tire.

Another embodiment of the vehicle tire according to the invention comprises a rubber member that extends in the circumferential direction of the tire over substantially its total circumference. The total surface area of the rubber member(s) of the vehicle tire preferably ranges from 1 to 50% of the total ground contacting surface area, more preferably from 1 to 25% and most preferably from 1 to 5% of the total ground contacting surface area.

Although the geometrical positioning of the rubber member(s) as seen in the ground contacting surface of the tread layer may be chosen at will, a vehicle tire embodiment comprising two rubber members arranged aside from each other in a central zone of the tire is preferred.

The invention also relates to a method of manufacturing the tread portion of a vehicle tire to be provided on a package of reinforcement layers of the tire, the tread portion comprising a tread layer that provides a ground contacting surface and is disposed in a radially outward part of the tire, and a tread base layer arranged underneath the tread layer, the tread portion further comprising at least one rubber member that extends in the radial direction of the tire from the ground contacting surface to the reinforcement package, the method comprising providing a tread layer rubber composition having a electrical resistivity at room temperature of more than $10^8$ ohm-cm; a tread base layer rubber composition having a electrical resistivity at room temperature of between $10^6$ ohm-cm and $10^8$ ohm-cm; and a member rubber composition having a electrical resistivity at room temperature of less than $10^6$ ohm-cm; and co-extruding the tread layer rubber composition, the tread base layer rubber composition and the member rubber composition to form a co-extrusion comprising three different rubber compositions.

Another embodiment of the method in accordance with the invention wherein the tread portion further comprises wing tips that are disposed at either side of the tire in the width direction thereof and extend in a circumferential direction of the tire, comprises providing a wing tip rubber composition having a electrical resistivity at room temperature of less than $10^6$ ohm-cm, and co-extruding the tread layer rubber composition, the tread base layer rubber composition, the member rubber composition and the wing tip rubber composition to form a co-extrusion comprising four different rubber compositions.

After the tread portion of the tire has been co-extruded according to the method of the invention and the rubber member(s) formed as described above, the tread portion is combined with other components of the tire, such as with the reinforcement package, and vulcanized according to well known practices.

BRIEF DESCRIPTION OF DRAWINGS

The invention will now be further elucidated on the basis of the accompanying figures, without however being limited thereto. In the figures.

DETAILED DESCRIPTION

Figure 1:
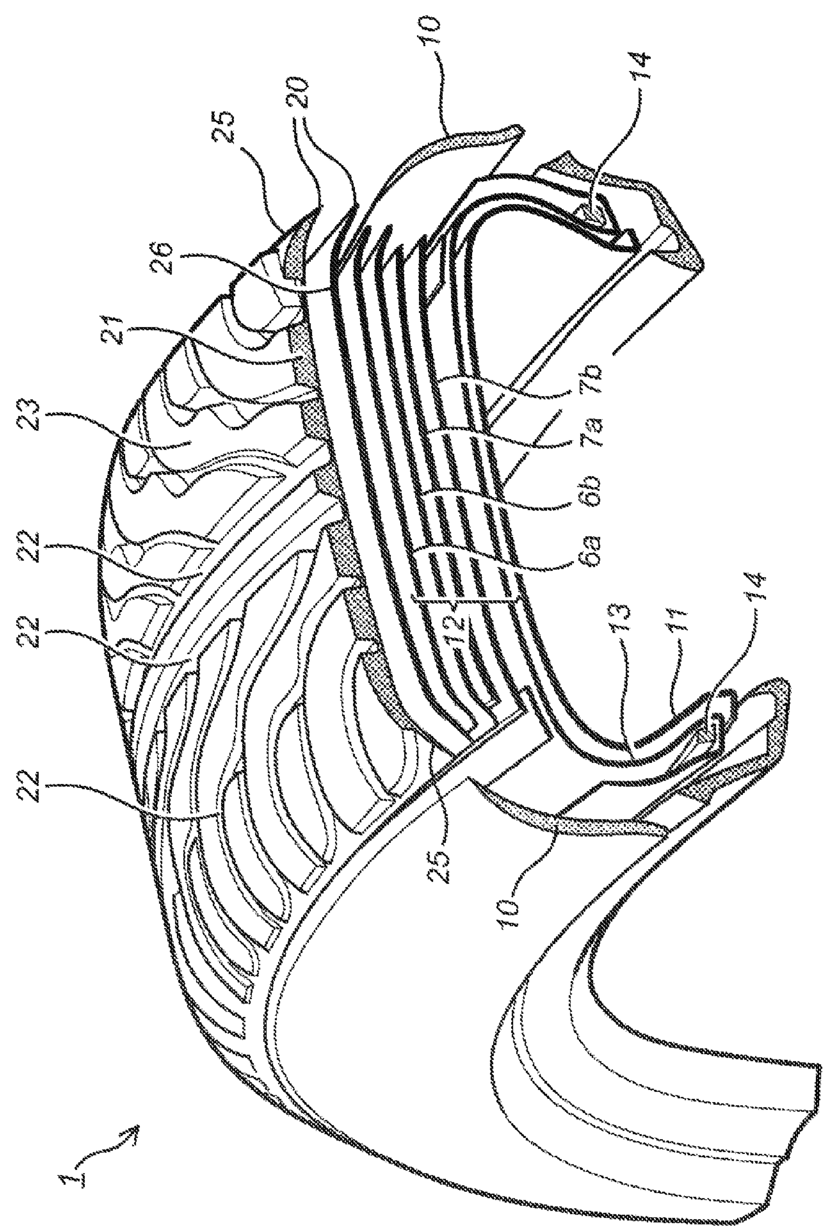
FIG. 1 schematically shows a perspective exploded view of a cross-sectional part of a tire according to the prior art.

Referring to FIG. 1, tire 1 comprises a tread portion 20 that is composed of different parts as will be elucidated further below, and a sidewall portion 10 of a rubber polymer. The tread portion 20 comprises a tread layer 21 that is provided with longitudinal and transverse grooves 22 and provides a ground contacting surface 23 disposed in a radially outward part of the tread portion 20. The tread portion 20 further comprises a tread base layer 26 arranged underneath the tread layer 21, the tread base layer 26 being formulated to provide adequate adhesion to an underlying reinforcement package 12 (see also FIGS. 2 and 3) of several reinforcement layers. Reinforcement package 12 generally comprises one or more cap ply layers 6 (in FIG. 1 two cap ply layers (6*a*, 6*b*) are shown) which may be a nylon overhead, one or more belt or steel cord layers 7 (in FIG. 1 two belt layers (7*a*, 7*b*) are shown) and a carcass layer 13, provided underneath the belt layers 7. At the sides of the tread portion 20, wing tips 25 are provided disposed at either side of the tire in the width direction 5 thereof and extending in a circumferential direction 4 of tire 1. The carcass layer 13 is mechanically connected to the bead wire 14 and is provided with an inner liner 11 of a rubber that may differ from the rubber used in the sidewall 10.

Figure 2:
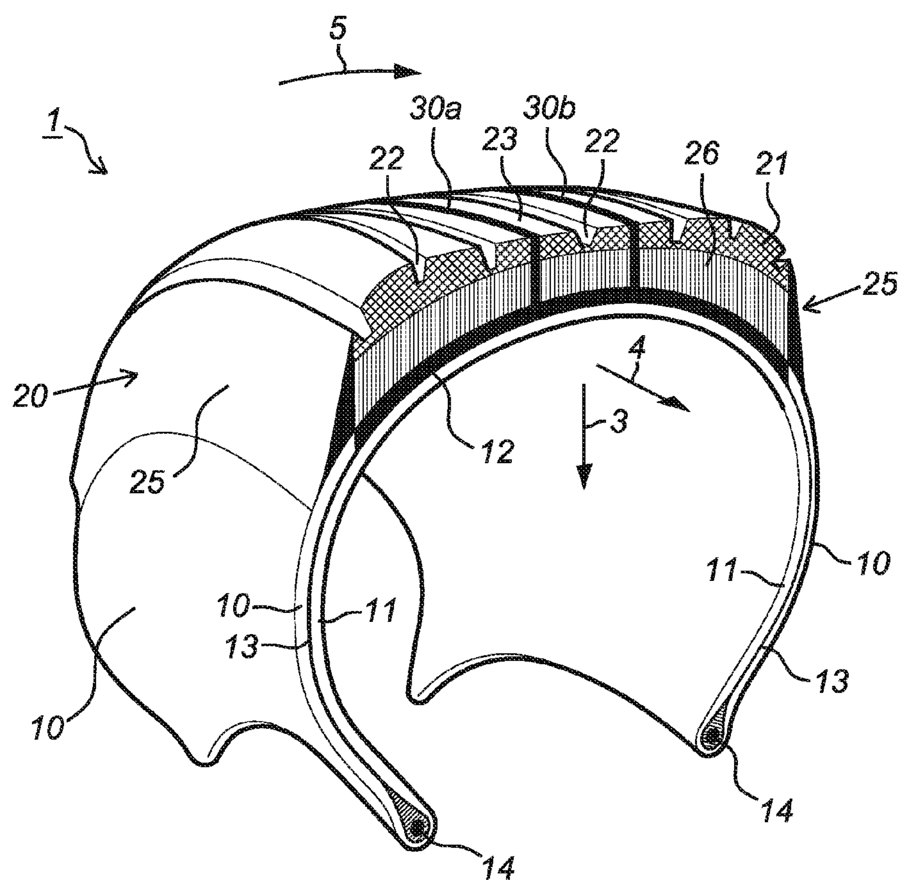
FIG. 2 schematically shows a perspective view of a cross-sectional part of a tire according to an embodiment of the invention.

Referring to FIG. 2, a tire 1 according to an embodiment of the invention is shown. Tire 1 comprises a tread portion 20 that is composed of different parts as will be elucidated further below, and a sidewall portion 10 of a rubber polymer. The tread portion 20 comprises a tread layer 21 that is provided with longitudinal and transverse grooves 22 and provides a ground contacting surface 23 disposed in a radially outward part of the tread portion 20. The tread portion 20 further comprises a tread base layer 26 arranged underneath the tread layer 21, the tread base layer 26 being formulated to provide adequate adhesion to an underlying reinforcement package 12, which, as shown in FIG. 1 may comprise one or more cap ply layers 6, one or more belt or steel cord layers 7, and a carcass layer 13. At the sides of the tread portion 20, wing tips 25 are provided disposed at either side of the tire in the width direction 5 thereof and extending in a circumferential direction 4 of tire 1 in direct contact with the sidewall rubber 10. The carcass layer 13 is mechanically connected to the bead wire 14 and is provided with an inner liner 11. The tread portion 20 of the embodiment shown comprises a poorly conducting tread layer 21 whereas the wing tip 25 rubber composition has an electrical resistivity at room temperature of less than $10^6$ ohm-cm. In the embodiment shown, the tread portion 20 further comprises two rubber members (30*a*, 30*b*) that extend in the radial direction 3 of the tire from the ground contacting surface 23 to the reinforcement package 12.

The tread layer 21 rubber composition has an electrical resistivity at room temperature of more than $10^8$ ohm-cm, and is therefore poorly conducting. The rubber composition used in the tread layer 21 of the present invention preferably comprises fillers containing silica for instance. Such compositions enhance the performance of the tire when driving on wet roads in particular and provide economical rolling resistance. The rubber compositions used in other parts of the tire may be synthetic rubbers or natural rubber and blends thereof. Non-limitative examples of synthetic rubbers include ethylene-propylene-diene copolymer rubber (EPDM), polyisoprene rubber (IR), polybutadiene rubber (BR), styrene-butadiene rubber (SBR), butyl rubber, and halogenated butyl rubber. Among these rubbers, SBR, such as SBR obtained by emulsion polymerization and SBR obtained by solution polymerization are preferably used.

In accordance with the invention, the tread base layer 26 rubber composition has an electrical resistivity at room temperature of between $10^6$ ohm-cm and $10^8$ ohm-cm. The tread base layer 26 is this able to conduct some electrical charges (is moderately conducting) but is essentially formulated to improve rolling and handling behavior of the tire 1. The rubber composition of the members (30*a*, 30*b*) is chosen to have an electrical resistivity at room temperature of less than $10^6$ ohm-cm, while at least one layer rubber composition of the reinforcement package 12 has an electrical resistivity at room temperature of less than $10^6$ ohm-cm.

Typical fillers used in the more conductive parts of the tire 1 comprise carbon black and/or ionic salts in amounts sufficient to obtain the electrical resistivity's mentioned above. Silane coupling agent may be used if desired, as well as other ingredients generally used in the rubber industry, such as zinc oxide, stearic acid, antioxidants, wax, and vulcanizing agents, within a range such the advantages of the present invention are not adversely affected. The conductive rubber compositions used in the tire for the wing tips 25 and/or the conductive rubbers members (30*a*, 30*b*) may be different or the same.

According to another embodiment of the invention, a vehicle tire is provided wherein the tread base layer rubber composition comprises 5-25 parts by weight on the total composition of carbon black having a nitrogen adsorption specific surface area ($N_2SA$) according to ASTM D3037 above 60 $m^2/g$ and 10-35 parts by weight on the total composition of carbon black having a nitrogen adsorption specific surface area ($N_2SA$) according to ASTM D3037 below 60 $m^2/g$.

A typical member (30*a*, 30*b*) rubber composition comprises 25 parts by weight on the total composition of carbon black having a nitrogen adsorption specific surface area ($N_2SA$) according to ASTM D3037 of 80 $m^2/g$. A typical wing tip 25 rubber composition comprises 35 parts by weight on the total composition of carbon black having a nitrogen adsorption specific surface area ($N_2SA$) according to ASTM D3037 of 60 $m^2/g$. A typical tread base 26 rubber and/or reinforcement 12 rubber composition has a dibutyl phthalate absorption (DBP) according to ASTM 2414-90 of between 95 ml/100 g.

Figure 3:
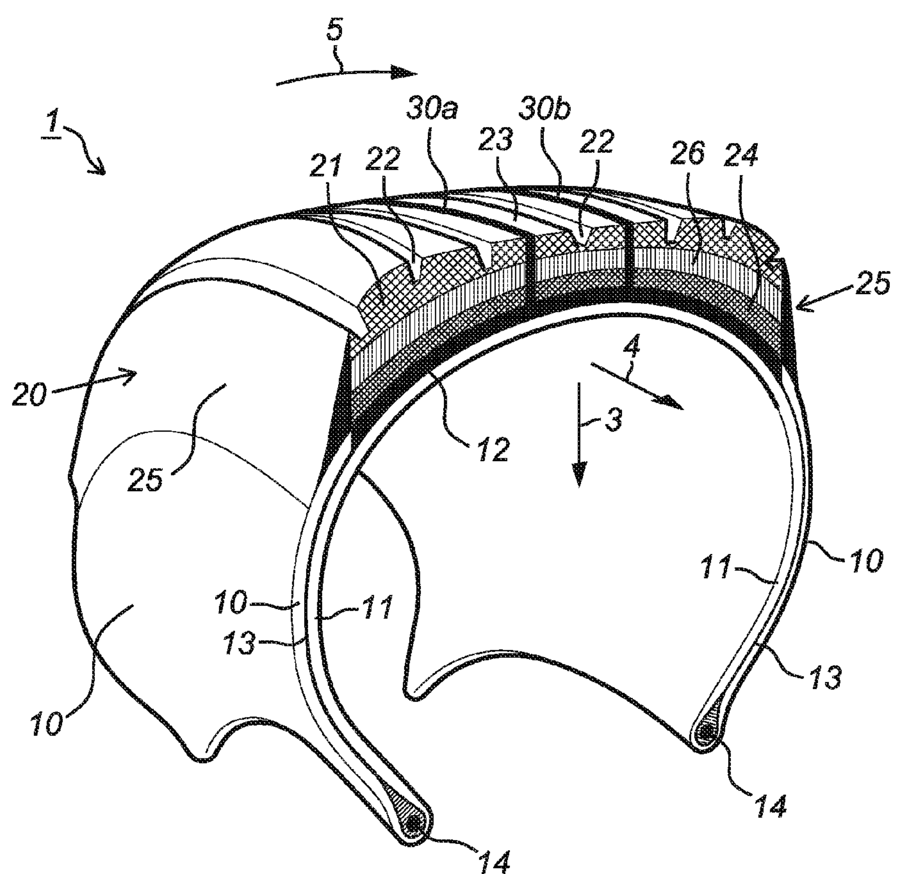
FIG. 3 schematically shows a perspective view of a cross-sectional part of a tire according to another embodiment of the invention.

In the embodiment shown, the wing tips 25 are arranged in conductive contact with the tread base layer 26. This is achieved by arranging the wing tips 25 in direct contact with the tread base layer 26, as shown in FIGS. 1 and 3. An alternative would be to provide a conductive layer (not shown) between the wing tips 25 and the moderately conducting layer 26. As also shown in the figures, the wing tips 25 are also arranged in conductive contact with the carcass layer 10, and this is achieved by arranging them in direct contact with the sidewall layers 10. This also means that the tread base layer 26 may not extend across the whole width of the tire tread portion 20. The present embodiment provides several conducting paths between the ground contacting surface 23 and the bead region 14, which is conductive per se. A first path is provided by the rubber members (30*a*, 30*b*) and the reinforcement package 12, whereas a second path is provided by the rubber members (30*a*, 30*b*), the tread base layer 26 and the wing tips 25. Providing several conducting paths allows to conduct more current but also improves the reliability of such conductance. If one path fails another path may still fulfill its function. It should be noted that the majority of the electrical current will flow through the rubber members (30*a*, 30*b*) directly to the reinforcement package 12 and to the bead region 14. A lesser amount of current will flow through the tread base layer 26 and wing tips 25 to the reinforcement package 12 and the bead region 14. This allows to optimize the properties of the tire 1 with respect to antistatic, rolling and handling behavior altogether.

Figure 4:
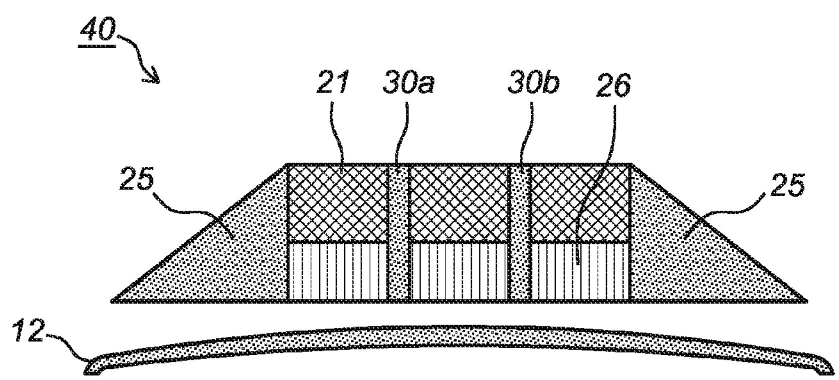
FIG. 4 schematically shows a cross-section of the tread portion 20 of the tire of FIG. 1 after co-extrusion and before molding into shape.

According to an embodiment of the method according to the invention, the tread layer 21, the tread base layer 26, the wing tips 25 and the rubber members (30*a*, 30*b*) are co-extruded using a triplex extrusion die in case the wing tip 25 rubber formulation is the same as the rubber formulation of the conductive members (30*a*, 30*b*). A cross-section of the produced co-extrusion 40 is shown in FIG. 4. The co-extrusion 40 may then be combined with other layers of the tire 1 such as a reinforcement layer 6, 7, 13, for instance by using a lamination drum.

Referring to FIG. 4, another embodiment of a vehicle tire according to the invention is shown. The tire in this embodiment comprises a tread base layer 26 (the layer directly underneath the tread layer 21) and an undertread layer 24 arranged underneath the tread base layer 26. The undertread layer 24 rubber composition has an electrical resistivity at room temperature of more than $10^7$ ohm-cm. The undertread layer 24 is most conveniently co-extruded together with tread layer 21, tread base layer 26, and the conductive rubber members (30*a*, 30*b*).

Figure 5:
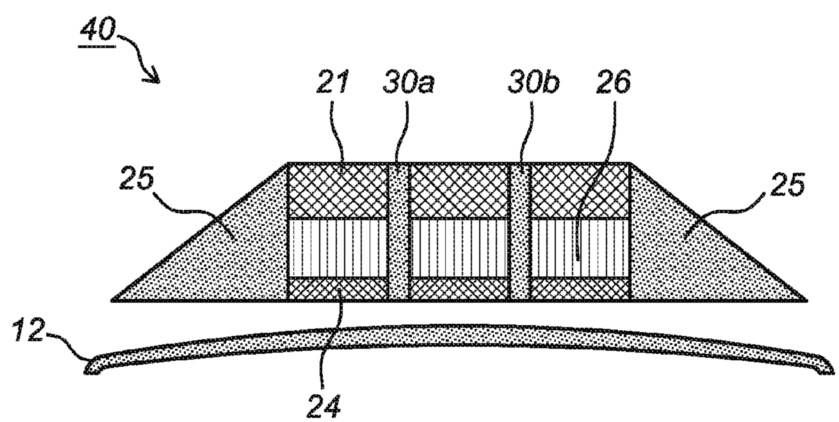
FIG. 5 schematically shows a cross-section of the tread portion 20 of the tire of FIG. 2 after co-extrusion and before molding into shape.

According to another embodiment of the method according to the invention, the tread layer 21, the tread base layer 26 and undertread layer 24, the wing tips 25 and the rubber members (30*a*, 30*b*) are co-extruded using a quadruplex extrusion die in case the wing tip 25 rubber formulation is the same as the rubber formulation of the conductive members (30*a*, 30*b*). A cross-section of the produced co-extrusion 40 is shown in FIG. 5. The co-extrusion 40 may then be combined with other layers of the tire 1 such as reinforcement layers 6, 7, 13, for instance by using a lamination drum.

The thickness of the rubber layer as a continuous layer after the curing is 100 μm-1 mm, preferably 200-800 μm considering the durability up to the running end stage. When the thickness exceeds 1 mm, the rolling resistance of the tire is degraded and the occurrence of uneven wear is promoted as mentioned above and also the peeling phenomenon is apt to be caused due to the difference of modulus of elasticity to the tread rubber and it is difficult to stably maintain the low value of electric resistance in the tire up to the running end stage.

Although the invention has been described herein by reference to specific embodiments thereof, it will be understood that such embodiments are illustrative only and are susceptible of modification and variation with departing from the inventive concepts disclosed. All such modifications and variations, therefore, are intended to be encompassed within the spirit and scope of the appended claims.

The invention claimed is:

1. A vehicle tire comprising:

a tread portion and a package of rubberized reinforcement layers arranged radially inwards from the tread portion, the tread portion comprising a tread rubber layer that provides a ground contacting surface and is disposed in a radially outward part of the tire, and a tread base rubber layer arranged radially inwards from the tread layer, the tread portion further comprising at least one rubber member that extends in the radial direction of the tire from the ground contacting surface to at least one layer of the reinforcement package, the rubber composition of the tread rubber layer having an electrical resistivity at room temperature of more than $10^8$ ohm-cm;

the rubber composition of the tread base rubber layer having an electrical resistivity at room temperature of between $10^6$ ohm-cm and $10^8$ ohm-cm;

the rubber composition of the at least one rubber member having an electrical resistivity at room temperature of less than $10^6$ ohm-cm; and the rubber composition of the at least one layer of the reinforcement package having an electrical resistivity at room temperature of less than $10^6$ ohm-cm.

2. The vehicle tire according to claim 1, wherein the tread base layer rubber composition comprises 5-25 parts by weight on the total composition of carbon black having a nitrogen adsorption specific surface area ($N_2SA$) according to ASTM D3037 above 60 $m^2/g$ and 10-35 parts by weight on the total composition of carbon black having a nitrogen adsorption specific surface area ($N_2SA$) according to ASTM D3037 below 60 $m^2/g$.

3. The vehicle tire according to claim 1, wherein the member rubber composition comprises 15-45 parts by weight on the total composition of carbon black having a nitrogen adsorption specific surface area ($N_2SA$) according to ASTM D3037 above 60 $m^2/g$.

4. The vehicle tire according to claim 1, the tread portion thereof further comprising rubber wing tips that are disposed at either side of the tire in the width direction thereof and extend in a circumferential direction of the tire, the rubber composition of the rubber wing tips having an electrical resistivity at room temperature of less than $10^6$ ohm-cm.

5. The vehicle tire according to claim 4, wherein the wing tip rubber composition comprises 20-50 parts by weight on the total composition of carbon black having a nitrogen adsorption specific surface area ($N_2SA$) according to ASTM D3037 above 60 $m^2/g$.

6. The vehicle tire according to claim 4, wherein the tread base rubber, wing tip rubber and/or reinforcement rubber compositions have a dibutyl phthalate absorption (DBP) according to ASTM 2414-90 of between 60-140 ml/100 g.

7. The vehicle tire according to claim 4, the wing tips being arranged in conductive contact with the tread base layer.

8. The vehicle tire according to claim 4, the wing tips being arranged in conductive contact with the at least one layer of the reinforcement package.

9. The vehicle tire according to claim 4, the wing tips being arranged in direct contact with the tread base layer.

10. The vehicle tire according to claim 4, the wing tips being arranged in direct contact with a sidewall layer.

11. The vehicle tire according to claim 10, the rubber composition of the sidewall layer and/or the at least one rubber member being the same as the rubber composition of the wing tips.

12. The vehicle tire according to claim 4, wherein the tread base rubber, wing tip rubber and/or reinforcement rubber compositions have a dibutyl phthalate absorption (DBP) according to ASTM 2414-90 of between 80-110 ml/100 g.

13. The vehicle tire according to claim 1, comprising an undertread rubber layer arranged radially inwards of the tread base layer, the rubber composition of the undertread rubber layer having an electrical resistivity at room temperature of more than $10^6$ ohm-cm.

14. The vehicle tire according to claim 13, the undertread layer rubber composition having an electrical resistivity at room temperature of more than $10^8$ ohm-cm.

15. The vehicle tire according to claim 1, each rubber member thereof extending in the circumferential direction of the tire over its total circumference.

16. The vehicle tire according to claim 1, the at least one rubber member is two rubber members arranged aside from each other in a central zone of the tire.

17. A method of manufacturing a vehicle tire according to claim 1, the method comprising:

forming the tread portion by co-extruding the tread layer rubber composition, the tread base layer rubber composition and the member rubber composition to form a co-extrusion comprising three different rubber compositions;

forming the tire with the co-extruded tread portion; and vulcanizing the tire.

18. The method of manufacturing a vehicle tire according to claim 4, the method comprising:

forming the tread portion by co-extruding the tread layer rubber composition, the tread base layer rubber composition, the member rubber composition and the wing tip rubber composition to form a co-extrusion comprising four different rubber compositions;

forming the tire with the co-extruded tread portion; and vulcanizing the tire.

* * * * *